(12) United States Patent
Orbe

(10) Patent No.: US 10,871,270 B2
(45) Date of Patent: Dec. 22, 2020

(54) OPTICAL DEVICES FOR PROVIDING CORRIDOR DUAL WALLWASH

(71) Applicant: SIGNIFY HOLDING B.V., Eindhoven (NL)

(72) Inventor: Orestes Orbe, Fairburn, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 100 days.

(21) Appl. No.: 16/014,421

(22) Filed: Jun. 21, 2018

(65) Prior Publication Data

US 2018/0372302 A1 Dec. 27, 2018

Related U.S. Application Data

(60) Provisional application No. 62/523,370, filed on Jun. 22, 2017.

(51) Int. Cl.
| | |
|---|---|
| F21V 7/00 | (2006.01) |
| F21V 13/04 | (2006.01) |
| F21V 7/04 | (2006.01) |
| F21V 7/09 | (2006.01) |
| F21V 5/04 | (2006.01) |
| F21V 7/06 | (2006.01) |
| G02B 19/00 | (2006.01) |
| F21Y 101/00 | (2016.01) |
| F21Y 115/10 | (2016.01) |

(52) U.S. Cl.
CPC .............. *F21V 13/04* (2013.01); *F21V 5/043* (2013.01); *F21V 7/0091* (2013.01); *F21V 7/045* (2013.01); *F21V 7/06* (2013.01); *F21V 7/09* (2013.01); *G02B 19/0028* (2013.01); *G02B 19/0061* (2013.01); *F21Y 2101/00* (2013.01); *F21Y 2115/10* (2016.08)

(58) Field of Classification Search
CPC ........ F21V 7/0091; F21V 13/04; F21V 5/046; F21V 5/043; F21V 7/09; G02B 19/0028; F21K 9/27; F21S 4/20
See application file for complete search history.

(56) References Cited

U.S. PATENT DOCUMENTS

| | | | | |
|---|---|---|---|---|
| 9,719,662 B1 * | 8/2017 | Householder | ........... | F21V 5/045 |
| 2014/0078732 A1 * | 3/2014 | Smith | ....... | F21V 7/06 |
| | | | | 362/235 |

* cited by examiner

*Primary Examiner* — William J Carter
*Assistant Examiner* — Omar Rojas Cadima

(57) ABSTRACT

An optical device for a light fixture can include a quasi-semi-cylindrical outer perimeter that includes a substantially planar bottom surface, a top surface located adjacent to the bottom surface, where the top surface has a curvature, and a pair of side surfaces located adjacent to the bottom surface and the top surface, where the pair of side surfaces are located opposite each other. The optical device can also include a body bounded by the outer perimeter. The optical device can further include an inner optical feature disposed in the body at the bottom surface, where the inner optical feature forms a cavity bounded by multiple segments, wherein each two adjacent segments form an angle relative to each other. The cavity can be configured to receive a light source of the light fixture.

20 Claims, 10 Drawing Sheets

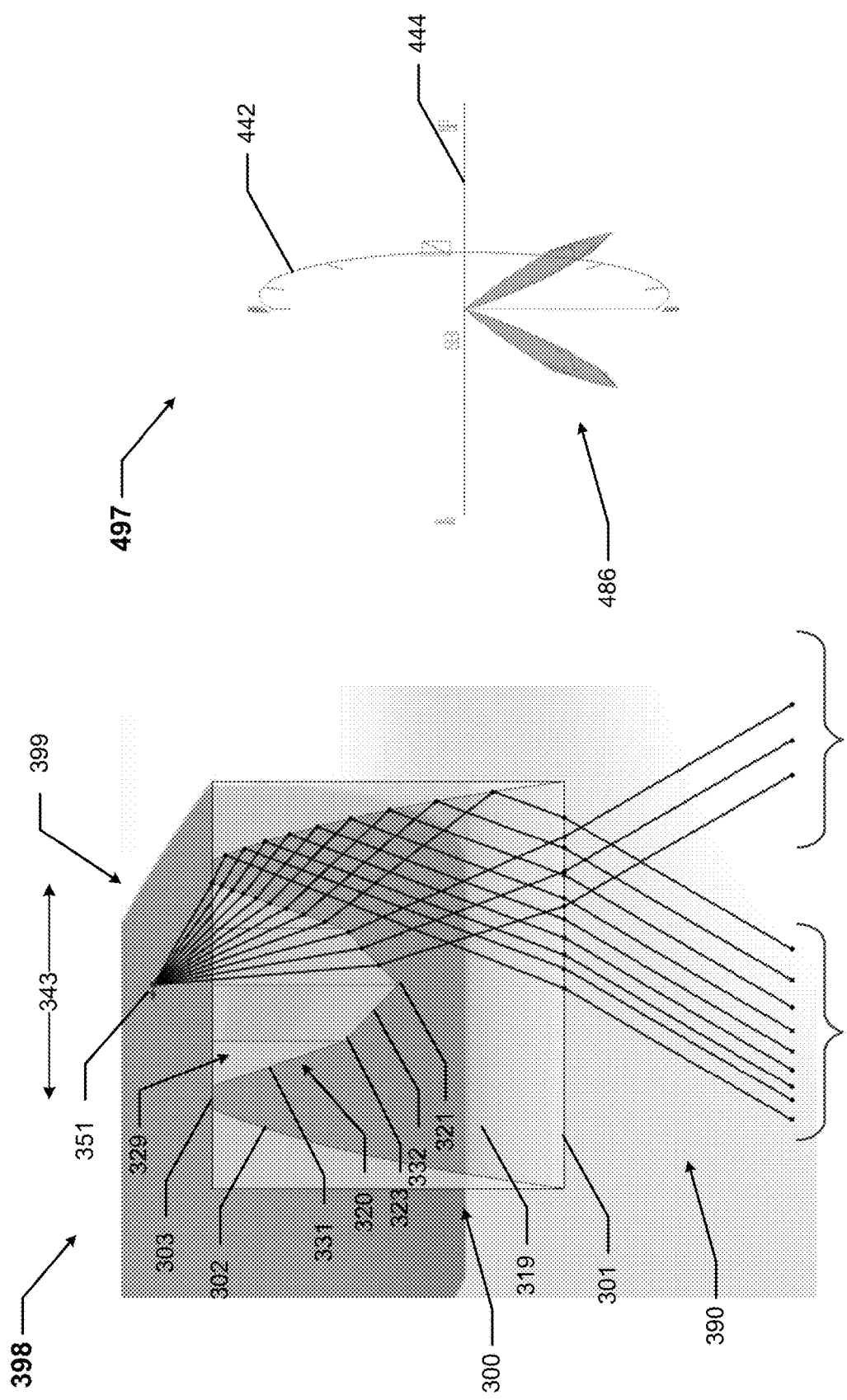

OPTICAL DEVICES FOR PROVIDING CORRIDOR DUAL WALLWASH

CROSS-REFERENCE TO RELATED APPLICATIONS

This application claims priority under 35 U.S.C. § 119 to U.S. Provisional Patent Application Ser. No. 62/523,370, titled "Optical Devices For Providing Corridor Dual Wallwash" and filed on Jun. 22, 2017, the entire contents of which are hereby incorporated herein by reference.

TECHNICAL FIELD

The present disclosure relates generally to lighting systems, and more particularly to systems, methods, and devices for optical devices that receive light from a light source and manipulate the light to generate particular light distribution patterns.

BACKGROUND

Volumes of space (e.g., rooms, hallways) have various shapes, sizes, and activities that occur therein. For example, corridors (also called hallways herein) are often long and narrow, and light fixtures in these corridors are often mounted on the ceiling and/or high on a wall. Because of the dimensions in corridors, it can be difficult to direct the light emitted by a light fixture to areas where the light is needed without also being able to control the intensity of the light.

SUMMARY

In general, in one aspect, the disclosure relates to an optical device for a light fixture. The optical device can include a quasi-semi-cylindrical outer perimeter having a substantially planar bottom surface. The quasi-semi-cylindrical outer perimeter can also include a top surface located adjacent to the bottom surface, where the top surface has a curvature. The quasi-semi-cylindrical outer perimeter can further include a pair of side surfaces located adjacent to the bottom surface and the top surface, where the pair of side surfaces are located opposite each other. The optical device can also include a body bounded by the outer perimeter. The optical device can further include an inner optical feature disposed in the body at the bottom surface, where the inner optical feature forms a cavity bounded by multiple segments, where each two adjacent segments form an angle relative to each other. The cavity can be configured to receive a light source of the light fixture.

In another aspect, the disclosure can generally relate to a light fixture, which can include a light source assembly having at least one light source. The light fixture can also include an optical device disposed adjacent to the at least one light source. The optical device of the light fixture can include a quasi-semi-cylindrical outer perimeter. The quasi-semi-cylindrical outer perimeter can include a bottom surface that is substantially planar. The quasi-semi-cylindrical outer perimeter can also include a top surface located adjacent to the bottom surface, where the top surface has a curvature. The quasi-semi-cylindrical outer perimeter can further include a pair of side surfaces located adjacent to the bottom surface and the top surface, where the pair of side surfaces are located opposite each other. The optical device of the light fixture can also include a body bounded by the outer perimeter. The optical device of the light fixture can further include an inner optical feature disposed in the body at the bottom surface, where the inner optical feature forms a cavity bounded by multiple segments, where each two adjacent segments form an angle relative to each other. The at least one light source can be disposed in the cavity.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 3A and 3B show a light fixture that includes an optical device assembly and associated light distribution in accordance with certain example embodiments.

FIG. 4 shows an intensity polar plot of light distribution for the light fixture of FIGS. 3A and 3B in accordance with certain example embodiments.

DETAILED DESCRIPTION

Figure 1A:
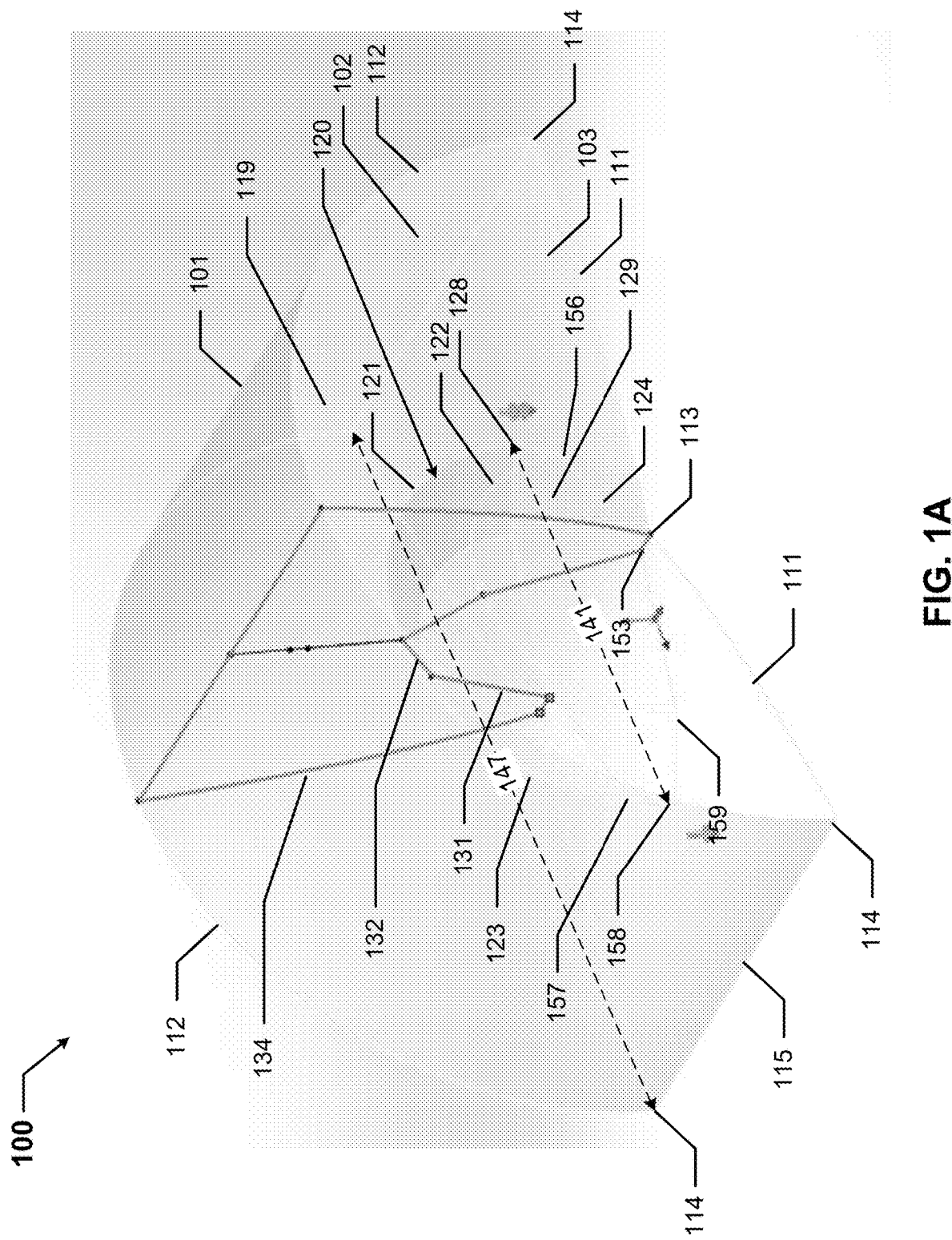
FIGS. 1A and 1B show various views of an optical device in accordance with certain example embodiments.

In general, example embodiments provide systems, methods, and devices for optical devices for providing dual wallwash in a corridor. Example optical devices provide a number of benefits. Such benefits can include, but are not limited to, more controlled light distribution in certain volumes of space, an aesthetically pleasing appearance, ease of cleaning and maintenance, and compliance with industry standards that apply to light fixtures located in certain environments.

Generally speaking, this application is directed to optical devices that control light emitted by one or more light sources of a light fixture. The specific examples provided herein are directed to optical devices for light fixtures. However, it is contemplated herein that example optical devices can be used with other types of enclosures having one or more light sources. Examples of other types of enclosures can include, but are not limited to, a control panel, a junction box, a breaker panel, a housing for a smoke detector, a flashlight and a housing for a ceiling fan. Therefore, example embodiments can be used with any type of enclosure and are not specifically limited to use with a light fixture.

Light fixtures having example optical devices (also called lenses herein) can be located in one or more of any of a number of environments. Examples of such environments can include, but are not limited to, indoors, outdoors, office space, a manufacturing plant, a warehouse, and a storage facility that is either climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A user may be any person that interacts with light fixtures having example optical devices. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

The example light fixtures having example optical devices (or components thereof) can be made of one or more of a number of suitable materials to allow the light fixture and/or other associated components to meet certain standards and/or regulations while also maintaining durability in light of the one or more conditions under which the light fixtures and/or other associated components of the light fixture can be exposed. Examples of such materials can include, but are not limited to, silicone, aluminum, stainless steel, fiberglass, glass, plastic, ceramic, polycarbonate, and rubber.

Example optical devices, or portions thereof, described herein can be made from a single piece (as from a mold, injection mold, or die cast process). In addition, or in the alternative, example optical devices can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

In the foregoing figures showing example embodiments of optical devices, one or more of the components shown may be omitted, repeated, and/or substituted. Accordingly, example embodiments of optical devices should not be considered limited to the specific arrangements of components shown in any of the figures. For example, features shown in one or more figures or described with respect to one embodiment can be applied to another embodiment associated with a different figure or description.

In certain example embodiments, light fixtures having example optical devices are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow a corresponding device to meet) such standards when applicable.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of optical devices will be described more fully hereinafter with reference to the accompanying drawings, in which example embodiments of optical devices are shown. Optical devices may, however, be embodied in many different forms and should not be construed as limited to the example embodiments set forth herein. Rather, these example embodiments are provided so that this disclosure will be thorough and complete, and will fully convey the scope of optical devices to those of ordinary skill in the art. Like, but not necessarily the same, elements (also sometimes called components) in the various figures are denoted by like reference numerals for consistency.

Terms such as "first", "second", "above", "below", "distal", "proximal", "end", "top", "bottom", "side", "length", "width", "height", and "within" are used merely to distinguish one component (or part of a component or state of a component) from another. Such terms are not meant to denote a preference or a particular orientation, and are not meant to limit embodiments of optical devices. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
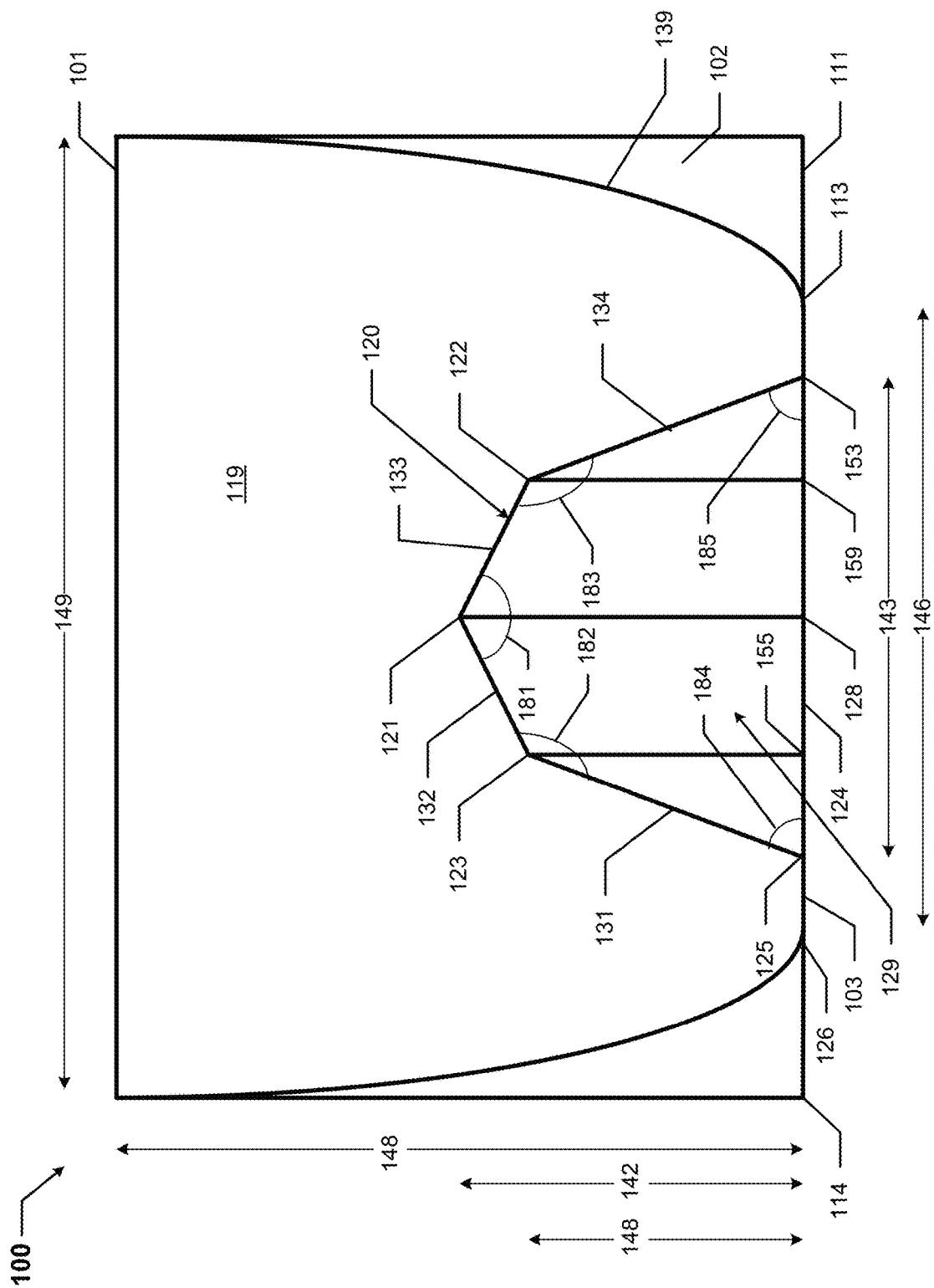

FIGS. 1A and 1B show a semi-transparent front-top-side perspective view and a cross-sectional front view, respectively, of an optical device 100 in accordance with certain example embodiments. The optical device 100 is generally shaped as half of a cylinder, with some variations. The optical device 100 has a number of outer surfaces. For example, the top surface 101 defines the outer perimeter through which light emitted by a light source traverses. When viewed from the side, the top surface 101, bounded by the bottom surface 103, forms a substantial semi-circle (and so is semi-cylindrical because of the width of the top surface 101), although other shapes can also be formed by the top surface 101.

The top surface 101 has a width 149, defined by the length of segment 115 that forms the junction between the top surface 101 and the bottom surface 103. The width 149 of the top surface 101 can be uniform along the entire length of the top surface 101, as is the case in FIGS. 1A and 1B. Alternatively, the width 149 of the top surface 101 can vary along the entire length of the top surface 101. In certain example embodiments, the top surface 101 is smooth and featureless along its entire length and width 149. Alternatively, one or more textures and/or features (e.g., sawtooth shape, ridges) can be disposed on some or all of the top surface 101.

The optical device 100 can also have two side surfaces 102. In certain example embodiments, one side surface 102 can be identical to the other side surface 102. Each side surface is adjacent to the top surface 101 and the bottom surface 103. Each side surface 102 in this case forms half of a generally parabolic shape with a very shallow slope. There are two segments 111, disposed on either side of center point 113 and center point 126, that define the boundary between a side surface 102 and the bottom surface 103. The shape and size of segments 111 are identical to the shape and size of any other segment that radiates from center point 113/center point 126 to an arc 112 that defines the boundary between a side surface 102 and the top surface 101 along the side surface 102. Because of the parabolic (or some similar) shape of each side surface 102, when combined with the semi-cylindrical shape along the top surface 101 and the bottom surface 103, the outer perimeter of the optical device 100 as a whole can be described as quasi-semi-cylindrical.

Each segment 111 is defined by center point 113/center point 126 and a corner point 114, where the corner point also defines an end of a segment 115. There is also the arc 112 that defines the boundary between a side surface 102 and the top surface 101. A side surface 102 can be smooth and featureless. Alternatively, as in this case, as shown in FIGS. 1A and 1B, a side surface 102 can have a slight curvature 139 (e.g., convex, concave) between the center point 113/center point 126 and the arc 112/corner points 114.

The bottom surface 103 of the optical device 100 can be planar. In some cases, the bottom surface 103 is smooth and featureless. Alternatively, the bottom surface 103 can have one or more textures and/or features. For example, in certain example embodiments, the bottom surface 103 can include one or more coupling features (e.g., detents, recesses, tabs, protrusions, mating threads, compression fittings) that allow the optical device 100 to couple to a component (e.g., a housing) of a light fixture and/or a structure (e.g., a wall, a ceiling). Additionally or alternatively, such coupling features can be disposed on some other portion (e.g., segment 115) of the optical device 100. In addition, or in the alternative, epoxy, glue, adhesive, or some other independent coupling feature or device can be used to couple the optical device 200 to a component of a light fixture and/or structure.

The bottom surface 103 can have a length 147 and a width. In this case, the width of the bottom surface 103 is variable along its length 147. Specifically, along segment 115 at either end of the bottom surface 103, the width is a distance that matches the width 149 of the top surface 101. This width gradually decreases toward the middle (represented by points 125 and 153) of the length 147 of the bottom portion 103, where the width of the bottom portion 103 is distance 146. In some cases, point 153 can coincide with center point 113, and point 125 can coincide with center point 126. In such a case, the distance 146 is equal to the width 143. In other cases, as shown in FIG. 1B, point 153 and center point 113 are separated from each other, and point 125 and center point 126 are separated from each other.

These outer surfaces (in this case, bottom surface 103, top surface 101, side surfaces 102) of the optical device 100 bound the interior 119 (also called a body 119) of the optical device 100. The body 119 of the optical device 100 can include, or not include, one or more of any of a number of optical characteristics. Examples of such optical characteristics can include, but are not limited to, haze, gloss, color, and clarity. The body 119 can be made of one or more of any number of materials (e.g., silicone, air) having any of a number of optical characteristics to manipulate light emitted by a light source in certain ways. In some cases, light traveling through the body 119 is unaltered by the body 119. One or more of the outer surfaces (e.g., the side surfaces 102) can be made of, or can include, a reflective and/or refractive material to reflect, rather than refract, light. In such a case, the example optical device 100 can be a total internal reflection (TIR) optic, only allowing light to exit the optical device 100 through the top surface 101.

In certain example embodiments, the optical device 100 has an inner optical feature 120 disposed within the body 119 at the bottom surface 103, defined by boundary 124. The inner optical feature 120 can form a cavity 129 that is empty (e.g., filled with air). When used in conjunction with a light source, the light source can be disposed within or adjacent to the cavity 129. The inner optical feature 120 of the optical device 100 can have a length 141 (in this case, the distance between point 128 and point 158 on the boundary 124 along the bottom surface 103), a width 143 (in this case, the distance between points 153 and 125 on the boundary 124 along the bottom surface 103), and a height 142 (in this case, the perpendicular distance between the highest point along the junction 121 and the plane represented by the bottom surface 103). There can be any of a number of other relationships between the height 142, the width 143, and/or the length 141. For example, in this case, the height 142 is one-half the length 141.

The inner optical feature 120 can have any of a number of configurations. For example, in this case, the inner optical feature 120 is symmetrical along the center junction 121, which in this example is an arc having ends that join the bottom surface 103 at point 128 and point 158 and which define the length 141 of the inner optical feature 120. In some cases, the inner optical feature 120 can lack symmetry. As stated above, the junction 121 is an arc, but in alternative embodiments, the junction 121 can have any of a number of other shapes, either in two or three dimensions.

In certain example embodiments, the inner optical feature 120 can have any of a number of multiple segments. In this case, there are four segments (segment 131, segment 132, segment 133, and segment 134), and each of the segments are oriented in parallel with each other. For example, as shown in FIGS. 1A and 1B, the inner optical feature 120 has segment 131 located adjacent to segment 132, which is located adjacent to segment 133, which is located adjacent to segment 134. Junction 121 represents the boundary between segment 132 and segment 133. Junction 123, also an arc, represents the boundary between segment 132 and segment 131. Junction 122, also an arc, represents the boundary between segment 133 and segment 134. Because of the symmetry of the inner optical feature 120 along junction 121, junction 122 and junction 123 have substantially the same shape and size as each other.

In this case, junction 121 has a height 142 relative to the bottom surface 103, and junction 122 and junction 123 have height 148 relative to the bottom surface 103. Segment 122 intersects the bottom surface 103 at point 156 and point 159. Segment 123 intersects the bottom surface 103 at point 157 and point 155. In alternative embodiments, one or more of the segments in an example inner optical feature can be asymmetrical with respect to a remainder of the segments. In addition, or in the alternative, one or more of the segments in an example inner optical feature can be arranged in some way other than parallel with respect to one or more of the other segments.

Within the cavity 129, segment 131 forms an acute angle 184 with the plane represented by the bottom surface 103. Similarly, within the cavity 129, segment 134 forms an acute angle 185 with the plane represented by the bottom surface 103. Further, within the cavity 129, segment 131 forms an angle 182 with segment 132. Similarly, within the cavity 129, segment 134 forms an angle 183 with segment 133. In this case, angle 182 and angle 183 are obtuse, although other types (e.g., perpendicular, acute) of angles can be formed. In addition, within the cavity 129, segment 132 forms an angle 181 with segment 133. In this case, angle 181 is obtuse, although other types (e.g., perpendicular 180°) of angles can be formed. Because of the symmetry of the inner optical feature 120 along junction 121 in this example, angle 182 is equal to angle 183, and angle 184 is equal to angle 185. In alternative embodiments, either or both of these pairs of angles can be unequal to each other.

While the inner optical feature 120 of FIGS. 1A and 1B has four different segments (in this case, segment 131, segment 132, segment 133, and segment 134), example inner optical features can have less than (e.g., three, two) or more than (e.g., five, eight, nine) four segments (also sometimes referred to as splines). When viewed cross-sectionally along their width (perpendicular to their length), each segment can be linear, as in this case. Alternatively, one or more of these segments, when viewed cross-sectionally along their width (perpendicular to their length), can have a curvature (e.g., convex, concave) and/or other features (e.g., sawtooth shape). The number of segments, as well as the width and curvature (or lack thereof) of each segment, as well as the angle formed between adjacent segments, are engineered to manipulate (e.g., TIR) the light that is emitted by a light source through the optical device 100 so that the ray trace is distributed in a particular way.

Further, while the inner optical feature 120 of FIGS. 1A and 1B is symmetrical, example inner optical features can be asymmetrical. Further, the orientation of the inner optical feature 120 can vary relative to the rest of the optical device 100. For example, in this case, the length 141 of the inner optical feature 120 coincides with the length 147 of the optical device 100, and the symmetrical axis (in this case, the junction 121) aligns with the midpoint along the width 149 of the optical device 100, thereby centering the inner optical feature 120 relative to the width 149 and length 147 of the optical device 100. In alternative embodiments, the orientation of the inner optical feature 120 relative to the rest of the optical device 100 and/or location of the inner optical feature 120 within the optical device 100 can vary.

As can be seen in FIGS. 1A and 1B, the example optical device 100 has a profile that is formed through a horizontal revolution (i.e., revolved around the base or bottom surface 103). By contrast, optical devices currently used in the art are formed by revolving around a vertical axis of symmetry. In this way, as described below, example embodiments can allow for optimized two-dimensional control (e.g., side-to-side and up-and-down).

Figure 2A:
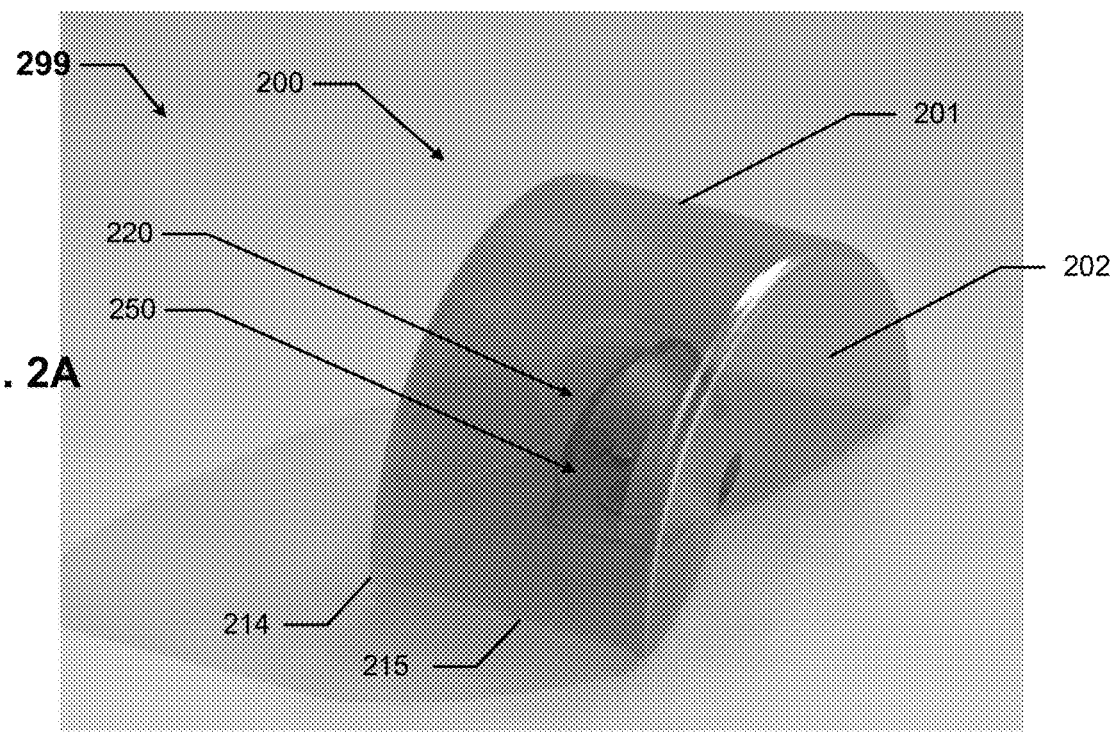
FIGS. 2A-2E show an optical device assembly in accordance with certain example embodiments.
Figure 2B:
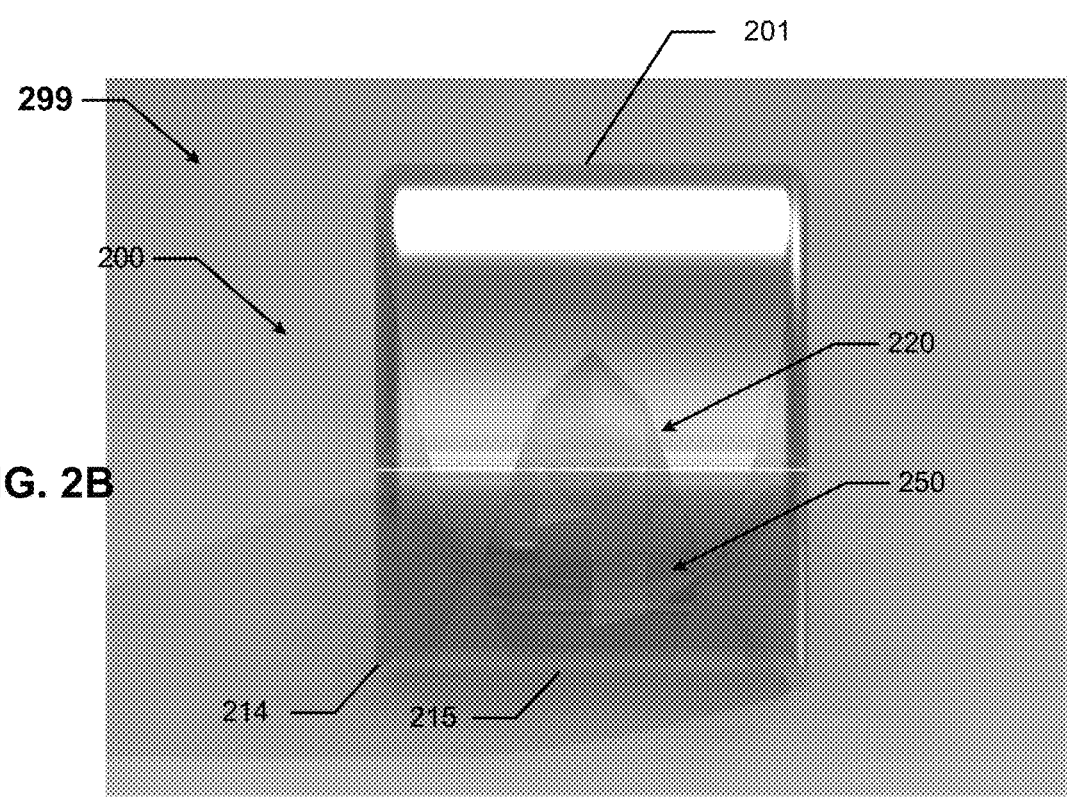
Figure 2C:
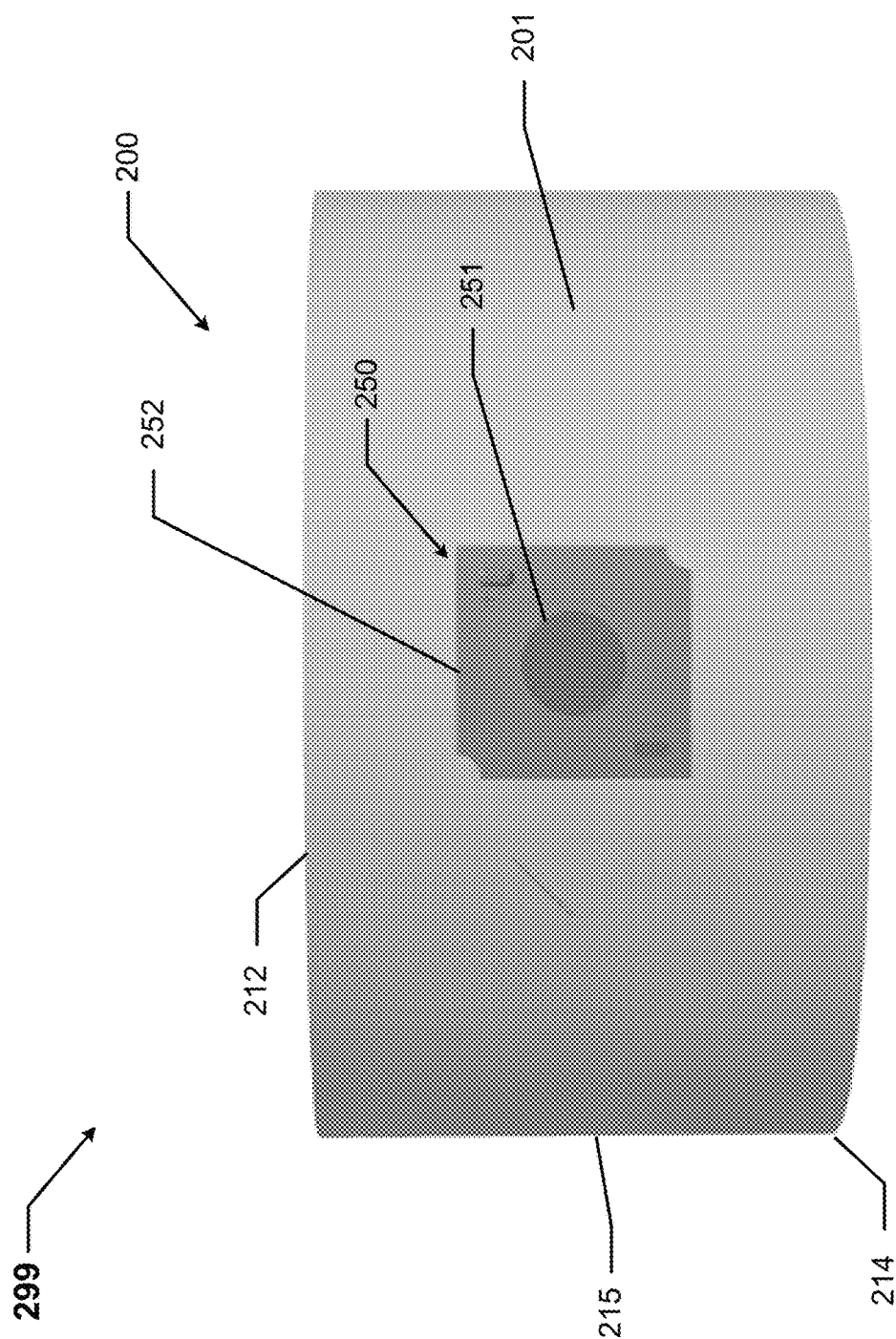
Figure 2D:
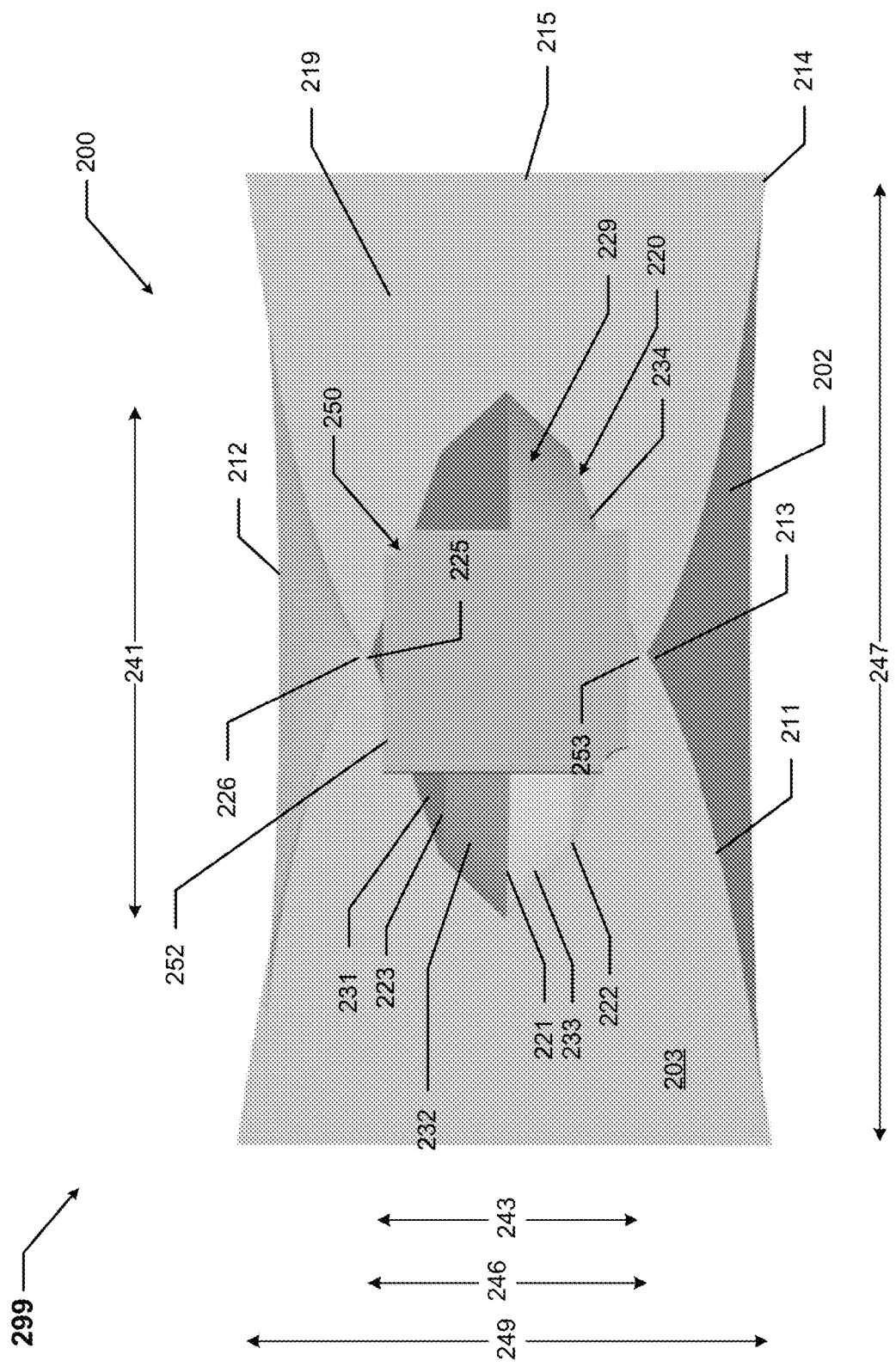

FIGS. 2A-2E show an optical device assembly 299 in accordance with certain example embodiments. Specifically, FIG. 2A shows a semi-transparent front-top-side perspective view of the optical device assembly 299. FIG. 2B shows a semi-transparent front view of the optical device assembly 299. FIG. 2C shows a top view (without the inner optical feature 220) of the optical device assembly 299. FIG. 2D shows a bottom view of the optical device assembly 299.

Figure 2E:
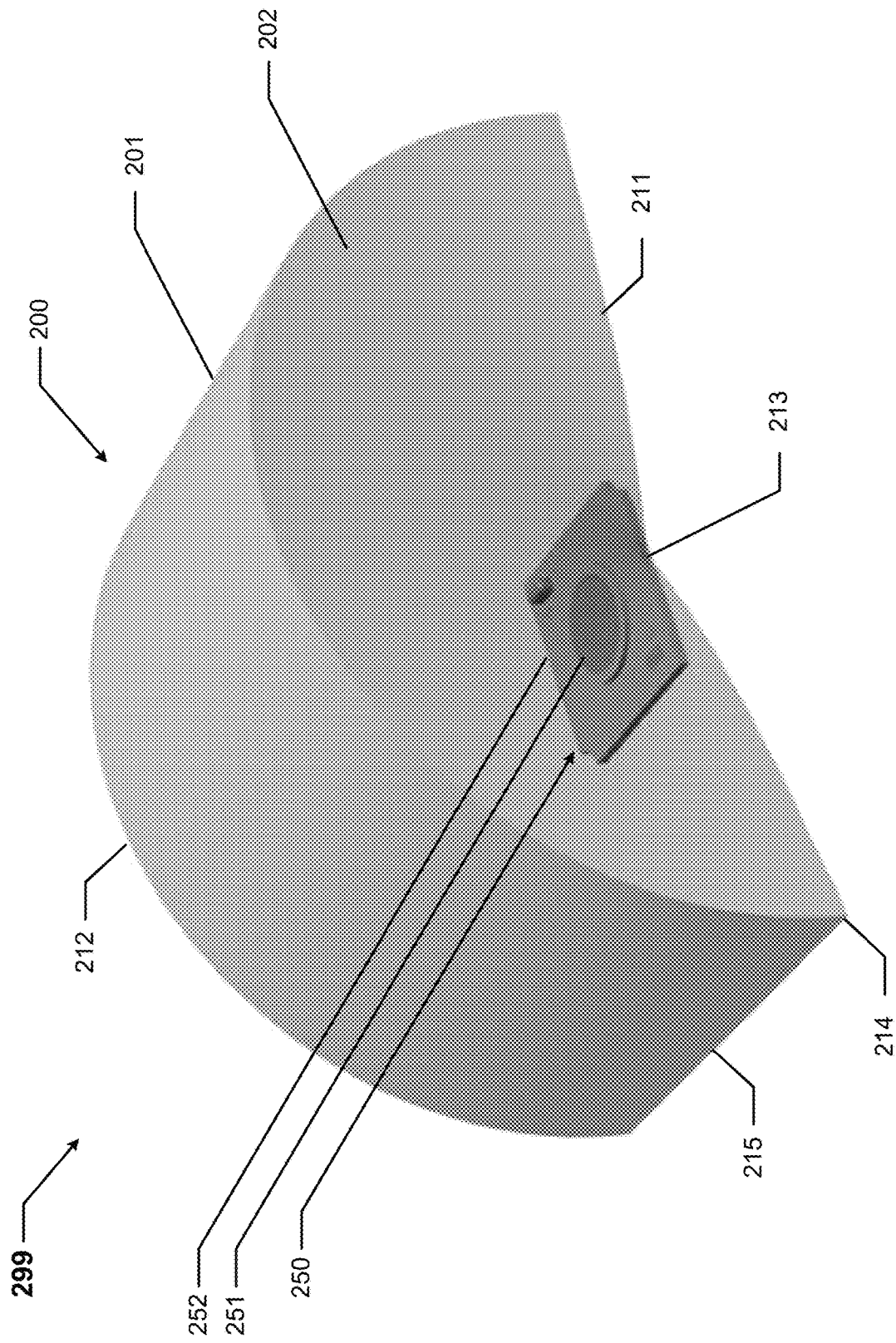

FIG. 2E shows a semi-transparent front-top-side perspective view (with the inner optical feature 220 hidden from view to better show certain features) of the optical device assembly 299.

Referring to FIGS. 1A-2E, the optical device assembly 299 of FIGS. 2A-2E includes an optical device 200 and a light source assembly 250. The optical device 200 of FIGS. 2A-2E can be substantially the same as the optical device 100 of FIGS. 1A and 1B. For example, the optical device 200 is generally shaped as half of a cylinder, with some variations. The optical device 200 has a number of outer surfaces. For example, the top surface 201 defines the outer perimeter through which light emitted by a light source traverses. When viewed from the side, as shown in FIG. 2E, the top surface 201 forms a substantial semi-circle, although other shapes can also be formed by the top surface 201.

The top surface 201 has a width 249, defined by the length of segment 215 that forms the junction between the top surface 201 and the bottom surface 203. The width 249 of the top surface 201 can be uniform along the entire length of the top surface 201, as is the case in FIGS. 2A-2E. Alternatively, the width 249 of the top surface 201 can vary along the entire length of the top surface 201. In certain example embodiments, the top surface 201 is smooth and featureless along its entire length 247 and width 249. Alternatively, one or more textures and/or features (e.g., sawtooth shape, ridges) can be disposed on some or all of the top surface 201.

The optical device 200 can also have two side surfaces 202. In certain example embodiments, one side surface 202 can be identical to the other side surface 202. Alternatively, the two side surfaces 202 can have one or more characteristics that are different from each other. Each side surface 202 is adjacent to the top surface 201 and the bottom surface 203. Each side surface 202 in this case forms half of a generally parabolic shape with a very shallow slope. There are two segments 211, disposed on either side of center point 213 and center point 226, that define the boundary between a side surface 202 and the bottom surface 203. The shape and size of segments 211 are identical to the shape and size of any other segment that radiates from center point 213/center point 226 to an arc 212 that defines the boundary between a side surface 202 and the top surface 201 along the side surface 202.

Each segment 211 is defined by center point 213/center point 226 and a corner point 214, where the corner point 214 also defines an end of a segment 215. There is also the arc 212 that defines the boundary between a side surface 202 and the top surface 201. A side surface 202 can be smooth and featureless. Alternatively, as in this case, a side surface 202 can have a slight curvature 239 (e.g., convex, concave) between the center point 213/center point 226 and the arc 212/corner points 214.

The bottom surface 203 of the optical device 200 can be planar. In some cases, the bottom surface 203 is smooth and featureless. Alternatively, the bottom surface 203 can have one or more textures and/or features. For example, in certain example embodiments, the bottom surface 203 can include one or more coupling features (e.g., detents, recesses, tabs, protrusions, mating threads, compression fittings) that allow the optical device 200 to couple to a component (e.g., a housing) of a light fixture and/or a structure (e.g., a wall, a ceiling). Additionally or alternatively, such coupling features can be disposed on some other portion (e.g., segment 215) of the optical device 200. In addition, or in the alternative, epoxy, glue, adhesive, or some other independent coupling feature or device can be used to couple the optical device 200 to a component of a light fixture and/or structure.

The bottom surface 203 can have a length 247 and a width. In this case, the width of the bottom surface 203 is variable along its length 247. Specifically, along segment 215 at either end of the bottom surface 203, the width is a distance that matches the width 249 of the top surface 201. This width gradually decreases toward the middle (represented by points 225 and 253) of the length 247 of the bottom portion 203, where the width of the bottom portion 203 is distance 246. In some cases, point 253 can coincide with center point 213, and point 225 can coincide with center point 226. In such a case, the distance 246 is equal to the width 243. In other cases, as shown in FIG. 2D, point 253 and center point 213 are slightly separated from each other, and point 225 and center point 226 are slightly separated from each other. As a result, distance 246 is slightly greater than the width 243 of the inner optical feature 220.

These outer surfaces (in this case, bottom surface 203, top surface 201, side surfaces 202) of the optical device 200 bound the interior 219 (also called the body 219) of the optical device 200. The body 219 of the optical device 200 can include, or not include, one or more of any of a number of optical characteristics. Examples of such optical characteristics can include, but are not limited to, haze, gloss, color, and clarity. The body 219 can be made of one or more of any number of materials (e.g., silicone, air) having any of a number of optical characteristics to manipulate light emitted by a light source in certain ways. In some cases, light traveling through the body 219 is unaltered by the body 219. One or more of the outer surfaces (e.g., the side surfaces 202) can be made of, or can include, a reflective and/or refractive material to reflect, rather than refract, light. In such a case, the example optical device 200 can be a total internal reflection (TIR) optic, only allowing light to exit the optical device 200 through the top surface 201.

In certain example embodiments, the optical device 200 has an inner optical feature 220 disposed within the body 219 at the bottom surface 203, defined by boundary 224. The inner optical feature 220 can form a cavity 229 that is empty (e.g., filled with air). When used in conjunction with a light source 251, the light source 251 can be disposed within or adjacent to the cavity 229. The inner optical feature 220 of the optical device 200 can have a length 241 (in this case, the end points of the junction 221 at the bottom surface 203), a width 243 (in this case, the distance between points 253 and 225 along the bottom surface 203), and a height (in this case, the perpendicular distance between the highest point along the junction 221 and the plane represented by the bottom surface 203).

The inner optical feature 220 can have any of a number of configurations. For example, in this case, the inner optical feature 220 is symmetrical along the center junction 221, which in this example is an arc having ends that join the bottom surface 203 and which define the length 241 of the inner optical feature 220. In some cases, the inner optical feature 220 can lack symmetry. As stated above, the junction 221 is an arc, but in alternative embodiments, the junction 221 can have any of a number of other shapes, either in two or three dimensions.

In certain example embodiments, the inner optical feature 220 can have a number of segments that are oriented in parallel with each other. For example, as shown in FIG. 2A-2E, the inner optical feature 220 has segment 231 located adjacent to segment 232, which is located adjacent to segment 233, which is located adjacent to segment 234. Junction 221 represents the boundary between segment 232 and segment 233. Junction 223, also an arc that in this case is parallel with junction 221, represents the boundary between segment 232 and segment 231. Junction 222, also an arc that in this case is parallel with junction 221, represents the boundary between segment 233 and segment 234. Because of the symmetry of the inner optical feature 220 along junction 221, junction 222 and junction 223 have substantially the same shape and size as each other. In this case, junction 221 has a height relative to the bottom surface 203 that is greater than the height of junction 222 and junction 223 relative to the bottom surface 203.

Within the cavity 229, segment 231 forms an acute angle 284 with the plane represented by the bottom surface 203. Similarly, within the cavity 229, segment 234 forms an acute angle 285 with the plane represented by the bottom surface 203. Further, within the cavity 229, segment 231 forms an angle 282 with segment 232. Similarly, within the cavity 229, segment 234 forms an angle 283 with segment 233. In this case, angle 282 and angle 283 are obtuse, although other types (e.g., perpendicular, acute) of angles can be formed.

In addition, within the cavity 229, segment 232 forms an angle 281 with segment 233. In this case, angle 281 is obtuse, although other types (e.g., perpendicular, acute, 180°) of angles can be formed. Because of the symmetry of the inner optical feature 220 along junction 221 in this example, angle 282 is equal to angle 283, and angle 284 is equal to angle 285. In alternative embodiments, either or both of these pairs of angles can be unequal to each other.

While the inner optical feature 220 of FIGS. 2A-2E has four different segments (in this case, segment 231, segment 232, segment 233, and segment 234), example inner optical features can have less than (e.g., three, two) or more than (e.g., five, eight, nine) four segments (also sometimes referred to as splines). When viewed cross-sectionally along their width (perpendicular to their length), each segment can be linear, as in this case. Alternatively, one or more of these segments, when viewed cross-sectionally along their width (perpendicular to their length), can have a curvature (e.g., convex, concave). The number of segments, as well as the width and curvature (or lack thereof) of each segment, as well as the angle formed between adjacent segments, are engineered to manipulate (e.g., TIR) the light that is emitted by a light source through the optical device 200 so that the ray trace is distributed in a particular way.

Further, while the inner optical feature 220 of FIGS. 2A-2E is symmetrical, example inner optical features can be asymmetrical. Further, the orientation of the inner optical feature 220 can vary relative to the rest of the optical device 200. For example, in this case, the length 241 of the inner optical feature 220 coincides with the length 247 of the optical device 200, and the symmetrical axis (in this case, the junction 221) aligns with the midpoint along the width 249 of the optical device 200, thereby centering the inner optical feature 220 relative to the width 249 and length 247 of the optical device 200. In alternative embodiments, the orientation of the inner optical feature 220 relative to the rest of the optical device 200 and/or location of the inner optical feature 220 within the optical device 200 can vary.

As can be seen in FIGS. 2A-2E, the example optical device 200 has a profile that is formed through a horizontal revolution (i.e., revolved around the base or bottom surface 203). By contrast, optical devices currently used in the art are formed by revolving around a vertical axis of symmetry. In this way, as described below, example embodiments can allow for optimized two-dimensional control (e.g., side-to-side and up-and-down).

The light source assembly 250 of FIGS. 2A-2E includes a base 252 and one or more light sources 251 disposed on the base 252. The base 252 can be a circuit board or other platform on which one or more of a number of components that are used to illuminate the light sources 251 are mounted. Examples of such components can include, but are not limited to, an integrated circuit, a resistor, a diode, a transistor, a capacitor, an inductor, a socket, a terminal block, and a switch. The light source 251 can be any of a number of different types of light sources, including but not limited to light-emitting diode (LED) light sources, fluorescent light sources, organic LED light sources, incandescent light sources, and halogen light sources. When the light source 251 is a LED light source, the light source 251 can include any type of LED technology, including, but not limited to, chip on board and discrete die.

In this case, the light source assembly 250 is positioned relative to the optical device 200 such that the back surface of the base 252 is substantially planar with the bottom surface 203 of the optical device 200. As a result, the light source 251 is disposed within the cavity 229 of the inner optical feature 220. In this case, there is a single light source 251 that is positioned substantially centered with respect to the length 241 and the width 243 of the inner optical feature 220.

Figure 3A:
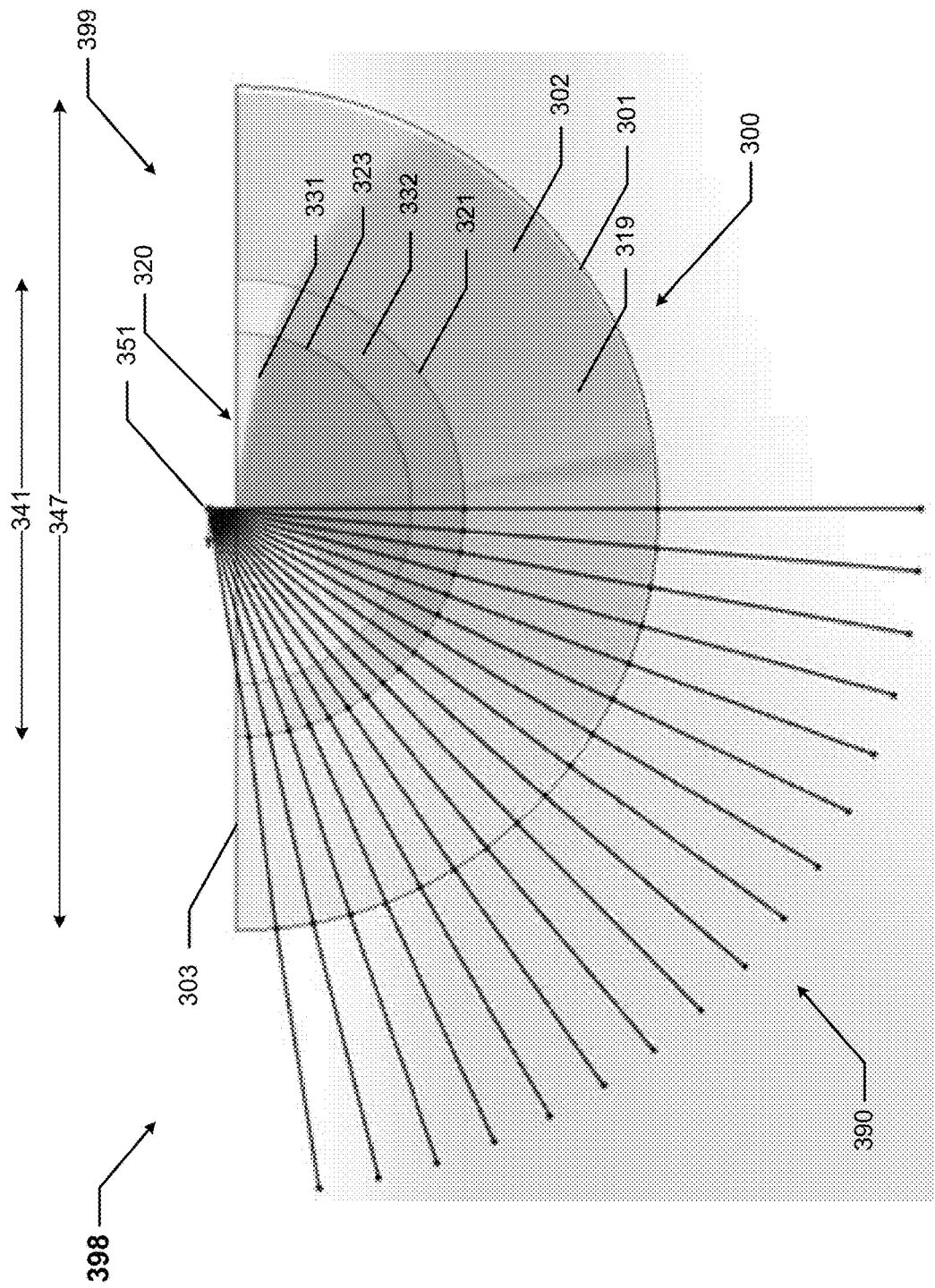

FIGS. 3A and 3B show a light fixture 398 that includes an optical device assembly 300 and associated light distribution 390 in accordance with certain example embodiments. Specifically, FIG. 3A shows a cross-sectional side view of the light fixture 398 and the associated light distribution 390, and FIG. 3B shows a front view of the light fixture 398 and the associated light distribution 390. Referring to FIGS. 1A-3B, the optical device assembly 399 of FIGS. 3A and 3B includes an optical device 300 and a light source assembly 350. The optical device 300 of FIGS. 3A and 3B can be substantially the same as the optical device 100 and the optical device 200 described above. Further, the light source assembly 350 of FIGS. 3A and 3B can be substantially the same as the light source assembly 250 of FIGS. 2A-2E, except as described below.

In this case, the light source assembly 350 of FIGS. 3A and 3B is positioned away from the optical device 300. As a result, the light source 351 of the light source assembly 350 of FIGS. 3A and 3B is disposed behind and adjacent to the inner optical feature 320 and the bottom surface 303 of the optical device 300. In this case, as with FIGS. 2A-2E, there is a single light source 351 that is positioned substantially centered with respect to the length 341 and the width 343 of the inner optical feature 320.

The ray-trace 390 (a representation of the light distribution) of the light emitted by the light source 351 using the optical device 300 is shown in FIGS. 3A and 3B. In this case, only half of the ray-trace 390 is shown. Since the optical device 300 in this case is symmetrical along its length 347, the half of the ray-trace not shown in FIGS. 3A and 3B is a mirror image of the ray-trace 390 shown in FIGS. 3A and 3B. From the side view of FIG. 3A, the path of the ray-trace 390 does not appear altered, and so the ray-trace 390 appears linear and radial from the light source 351 in FIG. 3A. In other words there is no deviation of the ray-trace 390 of light emitted from the light source 351, producing a Lambertian distribution on the zero degree vertical plane. However, from the front view of FIG. 3B, the path of the ray-trace 390 generated by the light source 351 is refracted and/or reflected.

As evidenced by the ray-trace 390 of FIGS. 3A and 3B, when the light initially is emitted by the light source 351, the light travels unimpeded within the cavity 329 of the inner optical feature 320. The inner optical feature 320 of FIGS. 3A and 3B has four segments. For example, segment 332 is defined by the bottom surface 303, junction 321, and junction 323. As another example, segment 331 is defined by the bottom surface 303 and junction 323. Upon reaching the outer perimeter (e.g., segment 331, segment 332) of the cavity 329, the light is refracted. The amount of refraction of the light at the outer perimeter of the cavity 329 of the inner optical feature 320 depends on one or more of a number of factors. For example, the various angles (e.g., the angle between segment 332 and segment 331, the angle between segment 331 and the bottom surface 303, the angle of a segment (e.g., segment 331) relative to the direction of the light radiating through that segment) determines the path at which light travels within the body 319 before being emitted through the top surface 301. For example, if a segment (e.g., segment 332, segment 331) is perpendicular relative to the path of the light (represented by ray trace 390), there is no refraction of that light as it passes through the segment into the body 319. As another example, if a segment is close to, but not quite, perpendicular relative to the path of the light, there is minimal refraction of that light as it passes through the segment into the body 319, such as what is shown in FIG. 3B.

Reflection occurs when the light reaches one of the side surfaces 302, which in this case are made of and/or coated with a refractive material (e.g., silicone, polycarbonate). The angle of reflection is determined by the path of the light relative to the orientation of the side surface 302. As the light exits the optical device 300 through the top surface 301, the light is again refracted. The light that is merely refracted (and not also reflected) by the optical device 300 forms distribution 392 of the ray-trace 390, and the light that is both reflected off of a side surface 302 and refracted by the top surface 301 of the optical device 300 forms distribution 391 of the ray-trace 390. As will be shown in FIGS. 4 and 7 below, distribution 391 of the ray-trace 390 can be directed to one wall in a corridor, and distribution 392 of the ray-trace 390 can be directed to an opposing wall in the corridor. Since the same holds true for the light that traverses the other half of the optical device 300, in a corridor setting, all of the light that is emitted out of the optical device 300 is directed to the side walls in the corridor, and essentially none of the light is directed toward the floor.

In this example, all of the light that is refracted by segment 331 (and so also its mirrored counterpart segment) of the inner optical feature 320 is later reflected by a side surface 302, and so segment 331 (and so also its mirrored counterpart segment) only works with the TIR portion of the optical device 300, Further, all of the light that is refracted by segment 332 (and so also its mirrored counterpart segment) of the inner optical feature 320 is later refracted by the top surface 301 and is not reflected by the side surfaces 302.

FIG. 4 shows an intensity polar plot 497 of light distribution 486 that corresponds to the ray-trace 390 for the light fixture of FIGS. 3A and 3B in accordance with certain example embodiments. Referring to FIGS. 1A-4, the intensity polar plot 497 plots the light distribution 486 in space in accordance with Type C photometry systems, plotted in terms of horizontal angles 444 ranging from 0°-360° and vertical angles 442 ranging from 0°-180°. In this case, the light distribution 486 is distributed in two equal halves, wherein one half is about 30° left of vertical (center), and the other half is about 30° right of vertical (center). With optics currently known in the art, light can only be directed to one, but not both, side walls. Therefore, example embodiments can allow for a single optic to direct light from a light fixture to both opposing side walls at the same time. As shown in FIGS. 3A, 3B, and 4, the optical device 300 allows for control of the light distribution 486 in two dimensions (in this case, up-down and left-right). At the same time, the three-dimensional light distribution 486 using the optical device 300 follow a Lambertian distribution pattern across the cross section (as shown in FIG. 3A).

Figure 5:
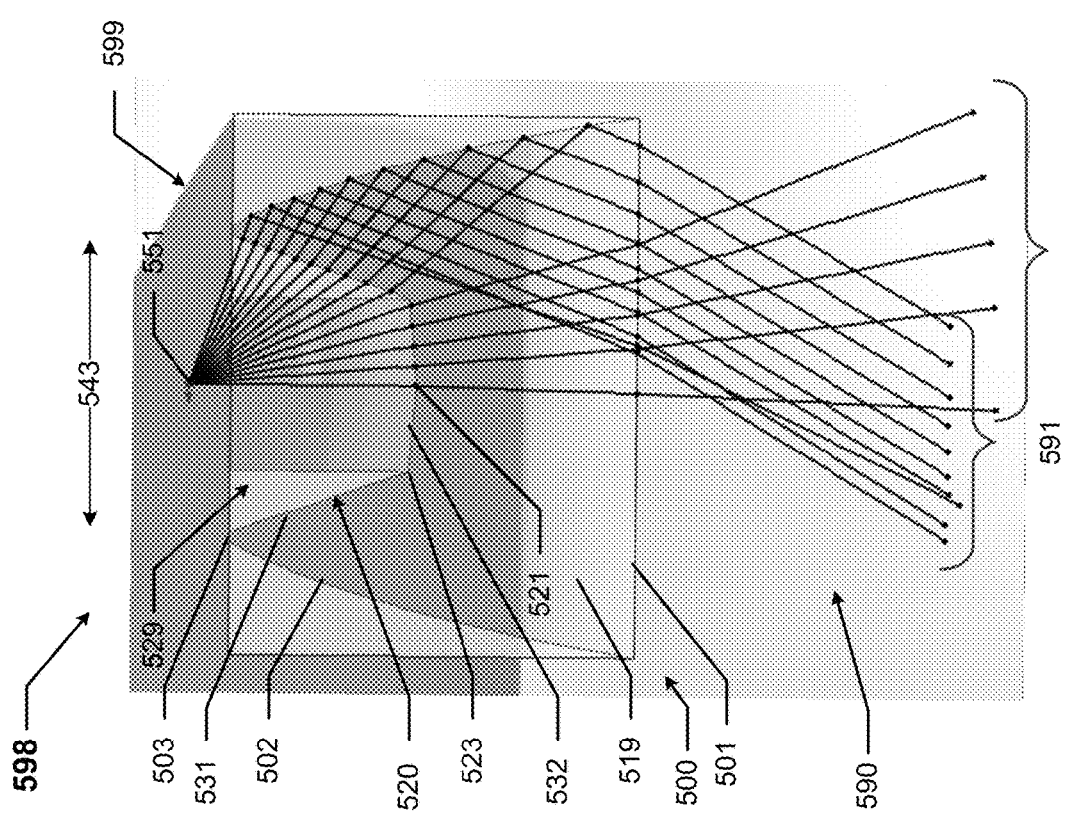
FIG. 5 shows another light fixture that includes an optical device assembly and associated light distribution in accordance with certain example embodiments.

FIG. 5 shows another light fixture 598 that includes an optical device assembly 500 and associated ray-trace 590 in accordance with certain example embodiments. Referring to FIGS. 1A-5, the optical device assembly 599 of FIG. 5 includes an optical device 500 and a light source 501. The optical device 500 of FIG. 5 can be substantially the same as the optical device 100, the optical device 200, and the optical device 300 described above, except as described below. Further, the light source assembly 550 of FIG. 5 can be substantially the same as the light source assembly 350 of FIGS. 3A and 3B.

The ray-trace 590 of the light emitted by the light source 551 using the optical device 500 is shown in FIG. 5. In this case, only half of the ray-trace 590 is shown. Since the optical device 500 is symmetrical along its length 547, the half of the ray-trace 590 not shown in FIG. 5 is a mirror image of the ray-trace 590 shown in FIG. 5. When viewed from the front, as in FIG. 5, the path of the light emitted by the light source 551 is refracted and/or reflected.

When the light initially is emitted by the light source 551, the light travels unimpeded within the cavity 529 of the inner optical feature 520. The inner optical feature 520 of FIG. 5 has four segments. For example, segment 532 is defined by the bottom surface 503, junction 521, and junction 523. As another example, segment 531 is defined by the bottom surface 503 and junction 523. Upon reaching the outer perimeter (e.g., segment 531, segment 532) of the cavity 529, the light is refracted. The amount of refraction of the light at the outer perimeter of the cavity 529 of the inner optical feature 520 depends on one or more of a number of factors. For example, the various angles (e.g., the angle between segment 532 and segment 531, the angle between segment 531 and the bottom surface 503, the angle of a segment (e.g., segment 531) relative to the direction of the light radiating through that segment) determines the path at which light travels within the body 519 before being emitted through the top surface 501.

While the inner optical feature 520 of FIG. 5 has four segments, as with the inner optical features shown and described above, the angle between segment 532 and what equates to segment 233 from FIGS. 2A-2E (but is unlabeled in this case to show the ray-traces 590) is almost 180°. Further, the angle between segment 531 and segment 532, as well as the angle between what equates to segment 233 and segment 234 from FIGS. 2A-2E, is slightly greater than 90°. As a result, as shown by the ray-trace 590 of FIG. 5, the light that exits the cavity 529 of the inner optical feature 520 through segment 532 (or its counterpart segment) has no reflection and essentially no refraction of that light as it passes through the segment, into the body 319, and through the top surface 501, as shown with the distribution 593 in FIG. 5. In other words, in this example, all of the light that is refracted (if at all) by segment 532 (and so also its mirrored counterpart segment) of the inner optical feature 520 is later minimally refracted, if at all, by the top surface 501 and is not reflected by the side surfaces 502.

Also as shown by the ray-trace 590 of FIG. 5, reflection occurs when the light reaches one of the side surfaces 502, which in this case are made of and/or coated with a reflective material. The angle of reflection is determined by the path of the light relative to the orientation of the side surface 502. Finally, as the light exits the optical device 500 through the top surface 501, the light 585 is again refracted. In this example, all of the light that is refracted by segment 531 (and so also its mirrored counterpart segment) of the inner optical feature 520 is later reflected by side surface 502, and so segment 531 (and so also its mirrored counterpart segment) only works with the TIR portion of the optical device 500, The light 585 that is merely refracted (and not also reflected) by the optical device 500 forms distribution 593 of the ray-trace 590, and the light that is both reflected off of a side surface 302 and refracted by the top surface 301 of the optical device 500 forms distribution 591 of the ray-trace 590. As will be shown in FIGS. 6 and 8 below, distribution 591 of the ray-trace 590 can be directed to one wall in a corridor, and distribution 593 of the ray-trace 590 can be directed to an opposing wall in the corridor. Since the same holds true for the light that traverses the other half of the optical device 500, in a corridor setting, most (about 80%) of the light that is emitted out of the optical device 500 is directed to a side wall in the corridor, and a minimal amount (about 20%) of the light is directed toward the floor.

Figure 6:
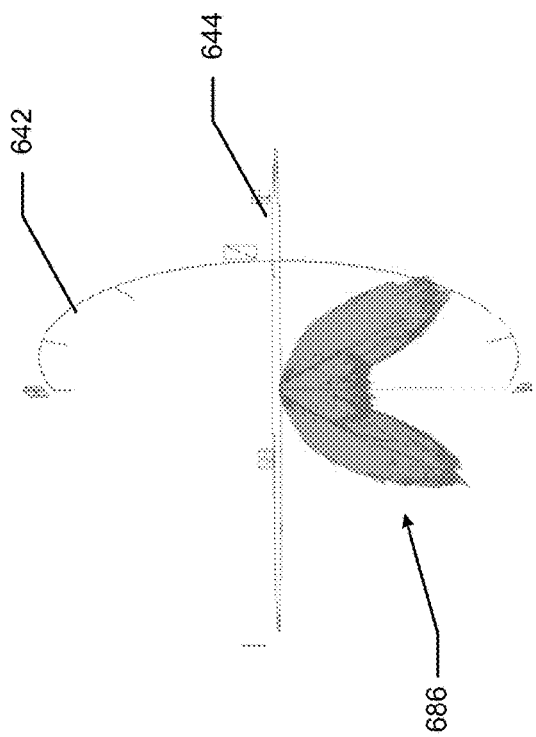
FIG. 6 shows an intensity polar plot of light distribution for the light fixture of FIG. 5 in accordance with certain example embodiments.

FIG. 6 shows an intensity polar plot 697 of light distribution 686 that corresponds to the ray-trace 590 for the light fixture 598 of FIG. 5 in accordance with certain example embodiments. Referring to FIGS. 1A-6, the intensity polar plot 697 plots the light distribution 686 in space in accordance with Type C photometry systems, plotted in terms of horizontal angles 644 ranging from 0°-360° and vertical angles 642 ranging from 0°-180°. In this case, the light distribution 686 is broken down as follows: Approximately 40% of the light is directed to about 20°-40° left of vertical (center), approximately 40% of the light is directed to about 20°-40° right of vertical (center), and the remaining approximately 20% of the light is directed to within 20° of vertical (center). Therefore, example embodiments can allow for a single optic to direct light from a light fixture to both opposing side walls at the same time, while also allowing for some downlight. As shown in FIGS. 5 and 6, the optical device 500 allows for control of the light distribution 686 in two dimensions (in this case, up-down and left-right). At the same time, the three-dimensional light distribution 686 using the optical device 500 follow a Lambertian distribution pattern along the cross section.

Figure 7:
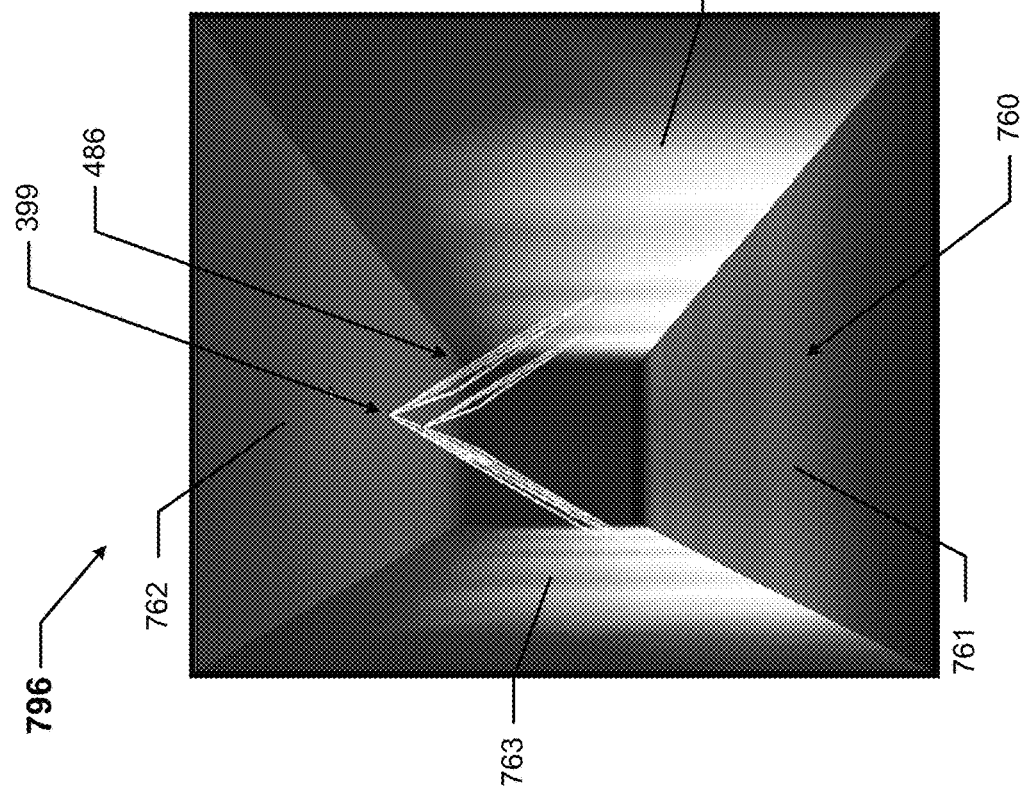
FIG. 7 shows the optical device assembly and associated light distribution of FIGS. 3A and 3B in a corridor in accordance with certain example embodiments.

FIG. 7 shows a system 796 that includes the optical device assembly 399 and associated light distribution 486 of FIGS. 3A, 3B, and 4 in a corridor 760 in accordance with certain example embodiments. Referring to FIGS. 1A-7, the corridor 760 has a floor 761, a ceiling 762, a left side wall 763, and a right side wall 764. The optical device assembly 399 is disposed against the ceiling 762, substantially equidistantly between the left side wall 763 and the right side wall 764. As a result, with the ray trace 390 and the light distribution 486 described above with respect to FIGS. 3A-4, there is only wallwash on the left side wall 763 and the right side wall 764, and there is no direct light directed toward the floor 761. While some light can be reflected on the floor 761 from side walls 763 and 764, in this example there is no direct transmission of light from photometric distribution 486 of the optical device 400. Also, with the configuration of the optical device 300 and its vertical position (in this case, at the plane) relative to the ceiling 762, there is a hard shadow along the top of side wall 763 and the top of side wall 764 adjacent to the ceiling 762.

Figure 8:
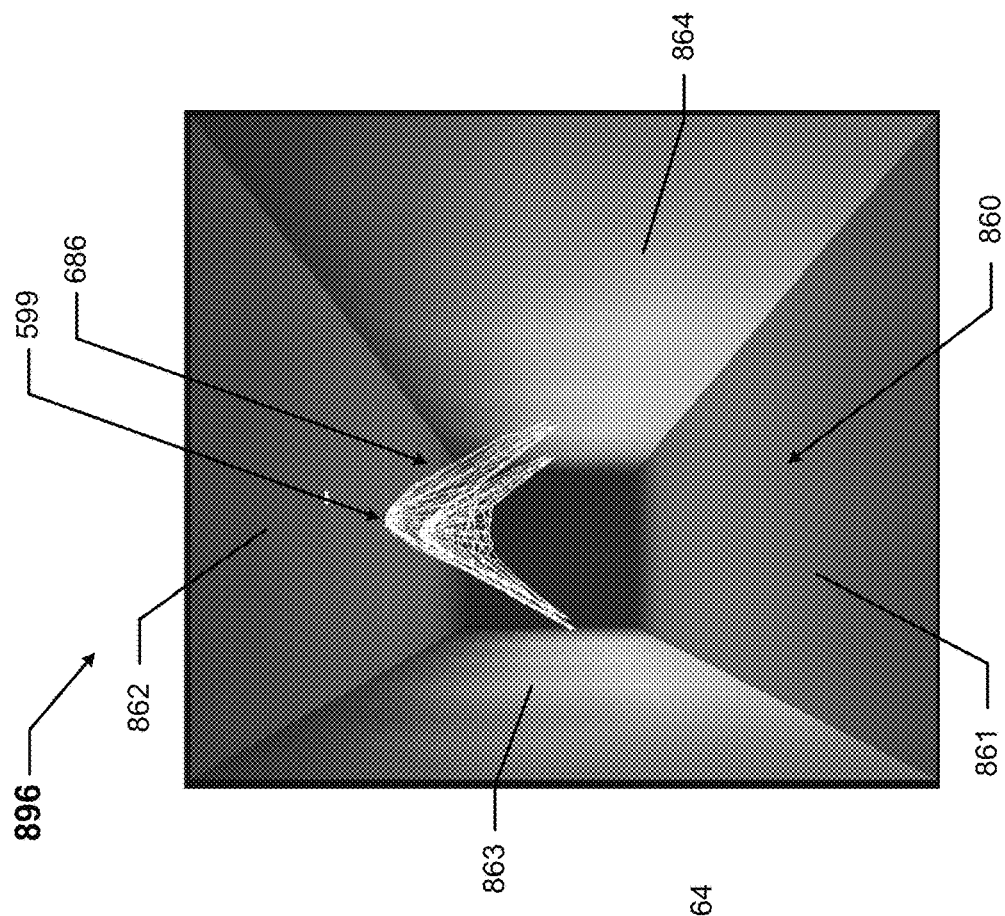
FIG. 8 shows the optical device assembly and associated light distribution of FIG. 5 in a corridor in accordance with certain example embodiments.

FIG. 8 shows another system 896 that includes the optical device assembly 599 of FIG. 5 and associated light distribution 686 (as shown in FIG. 6) in a corridor 860 in accordance with certain example embodiments. Referring to FIGS. 1A-8, the corridor 860 has a floor 861, a ceiling 862, a left side wall 863, and a right side wall 864. The optical device assembly 599 is disposed against the ceiling 862, substantially equidistantly between the left side wall 863 and the right side wall 864. As a result, with the ray-trace 590 and the light distribution 686 described above with respect to FIGS. 5 and 6, there is wallwash on the left side wall 863 and the right side wall 864, but also some light manipulated directly toward the floor 861. With the configuration of the optical device 500 and its vertical position (in this case, below the plane) relative to the ceiling 862, there is no hard shadow along the top of side wall 863 and the top of side wall 864 adjacent to the ceiling 862.

Example embodiments provide a number of benefits. Such benefits can include, but are not limited to, improved distribution of light from a light fixture, ease of maintenance, and compliance with industry standards that apply to light fixtures located in certain environments. Example embodiments, when mounted to a ceiling in a corridor, can be used to provide wallwash to both side walls in a corridor, with or without downlighting toward the floor. In addition, the example optical device can sit below the ceiling plane given its cylindrical shape, which can help to erase the hard shadows produced by traditional wallwash optical devices between the junction of the ceiling and the wall.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. An optical device for a light fixture, the optical device comprising:
   a quasi-semi-cylindrical outer perimeter comprising:
      a substantially planar bottom surface;
      a top surface located adjacent to the bottom surface, wherein the top surface has a width and a curvature along its length; and
      a pair of side surfaces located adjacent to the bottom surface and the top surface, wherein the pair of side surfaces are located opposite each other;
   a body bounded by the outer perimeter; and
   an inner optical feature disposed in the body at the bottom surface, wherein the inner optical feature forms a cavity bounded by a plurality of segments, wherein each two adjacent segments form a non-perpendicular angle relative to each other, wherein the plurality of segments of the inner optical feature are configured to refract light emitted by a light source into the cavity,
   wherein the cavity is configured to receive a light source of the light fixture,
   wherein the inner optical feature and the top surface are symmetrical about an axis that runs parallel to the width of the top surface and through a middle of the planar bottom surface and about a plane through the axis that is perpendicular to the substantially planar bottom surface,
   wherein each side surface of the pair of side surfaces comprises a refractive material, wherein the pair of side surfaces are configured to reflect, through total internal reflection, a portion of the light refracted by the plurality of segments of the inner optical feature,
   wherein the top surface is configured to further refract the portion of the light reflected off the pair of side surfaces and a remainder of the light emitted by the light source that is refracted by the plurality of segments without previously coming into contact with the pair of side surfaces, and
   wherein the light emitted through the top surface diverges from a virtual axis perpendicular to the substantially planar bottom surface.

2. The optical device of claim 1, wherein the curvature of the top surface forms a semi-circle.

3. The optical device of claim 1, wherein the bottom surface comprises at least one coupling feature that is configured to couple to the light fixture.

4. The optical device of claim 1, wherein the portion of the light and the remainder of the light traveling through the body are substantially unaltered by the body.

5. The optical device of claim 1, wherein the plurality of segments that form the cavity of the inner optical feature comprise a first segment, a second segment, a third segment, and a fourth segment, wherein the first segment is adjacent to the bottom surface, wherein the second segment is adjacent to the first segment, wherein the third segment is adjacent to the second segment, and wherein the fourth segment is adjacent to the third segment and the bottom surface.

6. The optical device of claim 5, wherein the first segment and the second segment are separated by a first junction, wherein the second segment and the third segment are separated by a second junction, wherein the third segment and the fourth segment are separated by a third junction, wherein the first junction and the third junction have a first length, wherein the second junction has a second length, wherein the second length is greater than the first length.

7. The optical device of claim 5, wherein the first segment and the bottom surface form a first angle, wherein the fourth segment and the bottom surface form the first angle, wherein the first segment and the second segment form a second angle, wherein the third segment and the fourth segment form the second angle, and wherein the second segment and the third segment form a third angle.

8. The optical device of claim 7, wherein the first angle is acute, wherein the second angle is obtuse, and wherein the third angle is acute.

9. The optical device of claim 8, wherein light traversing through the top surface, when the bottom surface is coupled to the light fixture in a ceiling of a corridor, is emitted toward both side walls in the corridor at a wallwash angle with no direct down light.

10. The optical device of claim 9, wherein the wallwash angle is approximately 30° from vertical.

11. The optical device of claim 7, wherein the first angle is acute, wherein the second angle is obtuse, and wherein the third angle is obtuse.

12. The optical device of claim 11, wherein the first angle is acute, wherein the second angle is slightly greater than 90°, and wherein the third angle is slightly less than 180°.

13. The optical device of claim 12, wherein light traversing through the top surface, when the bottom surface is coupled to the light fixture in a ceiling of a corridor, is emitted toward both side walls in the corridor with direct down light.

14. The optical device of claim 13, wherein positioning the optical device below a plane formed by the ceiling eliminates harsh shadows along a top end of both side walls adjacent to the ceiling.

15. The optical device of claim 1, wherein the plurality of segments of the inner optical feature are oriented along a length of the bottom surface, wherein the length of the bottom surface is defined by two opposing ends that adjoin the top surface.

16. The optical device of claim 1, wherein each segment of the plurality of segments is a spline.

17. A light fixture comprising:
a light source assembly comprising at least one light source; and
an optical device disposed adjacent to the at least one light source, wherein the optical device comprises:
a quasi-semi-cylindrical outer perimeter comprising:
a bottom surface that is substantially planar;
a top surface located adjacent to the bottom surface, wherein the top surface has a curvature; and
a pair of side surfaces located adjacent to the bottom surface and the top surface, wherein the pair of side surfaces are located opposite each other;
a body bounded by the outer perimeter; and
an inner optical feature disposed in the body at the bottom surface, wherein the inner optical feature forms a cavity bounded by at least four segments, wherein each two adjacent segments form an angle relative to each other,
wherein the at least one light source is disposed in the cavity,
wherein light emitted by the at least one light source travels through the cavity of the inner optical feature and is refracted by at least one of the at least four segments,
wherein at least a portion of the light is subsequently reflected, through total internal reflection, off of one of the pair of side surfaces within the body,
wherein the at least a portion of the light subsequently exits the body through and is refracted by the top surface of the quasi-semi-cylindrical outer perimeter, and wherein the inner optical feature is symmetrical along a virtual plane oriented along the length of the inner optical feature.

18. The light fixture of claim 17, wherein the optical device is a total internal reflection optic that only allows light emitted by the at least one light source of the light source assembly to exit through the top surface of the optical device.

19. An optical device for a light fixture, the optical device comprising:
a quasi-semi-cylindrical outer perimeter comprising:
a substantially planar bottom surface;
a top surface located adjacent to the bottom surface, wherein the top surface has a curvature along its length and a width; and
a pair of side surfaces located adjacent to the bottom surface and the top surface,
wherein the pair of side surfaces are located opposite each other;
a body bounded by the outer perimeter; and
an inner optical feature disposed in the body at the bottom surface, wherein the inner optical feature forms a cavity bounded by a plurality of segments, wherein each two adjacent segments form an angle relative to each other,
wherein the cavity is configured to receive a light source of the light fixture,
wherein the inner optical feature and the top surface are symmetrical about a virtual plane in the body that is perpendicular to the substantially planar bottom surface,
wherein the virtual plane is oriented along the width of the substantially planar bottom surface, and wherein the virtual plane, when extended into the cavity, intersects a middle of the substantially planar bottom surface along a length of the substantially planar bottom surface, wherein at least a portion of the light is subsequently reflected, through total internal reflection, off of one of the pair of side surfaces within the body,
wherein light emitted by the light source traverses through the top surface and forms a split beam on either side of the virtual plane with no direct down light along the virtual plane.

20. The optical device of claim 19, wherein light emitted into the cavity only exits through the top surface.

* * * * *